July 6, 1965   H. MULCH   3,192,657
AUTOMATIC SLIDE CHANGING MECHANISM
Filed Sept. 20, 1961   5 Sheets-Sheet 1

INVENTOR
HANS MULCH
BY
Toulmin & Toulmin
ATTORNEYS

July 6, 1965  H. MULCH  3,192,657
AUTOMATIC SLIDE CHANGING MECHANISM
Filed Sept. 20, 1961  5 Sheets-Sheet 3

INVENTOR
HANS MULCH
BY
Toulmin & Toulmin
ATTORNEYS

July 6, 1965  H. MULCH  3,192,657
AUTOMATIC SLIDE CHANGING MECHANISM
Filed Sept. 20, 1961  5 Sheets-Sheet 4

INVENTOR
HANS MULCH
BY
Toulmin & Toulmin
ATTORNEYS

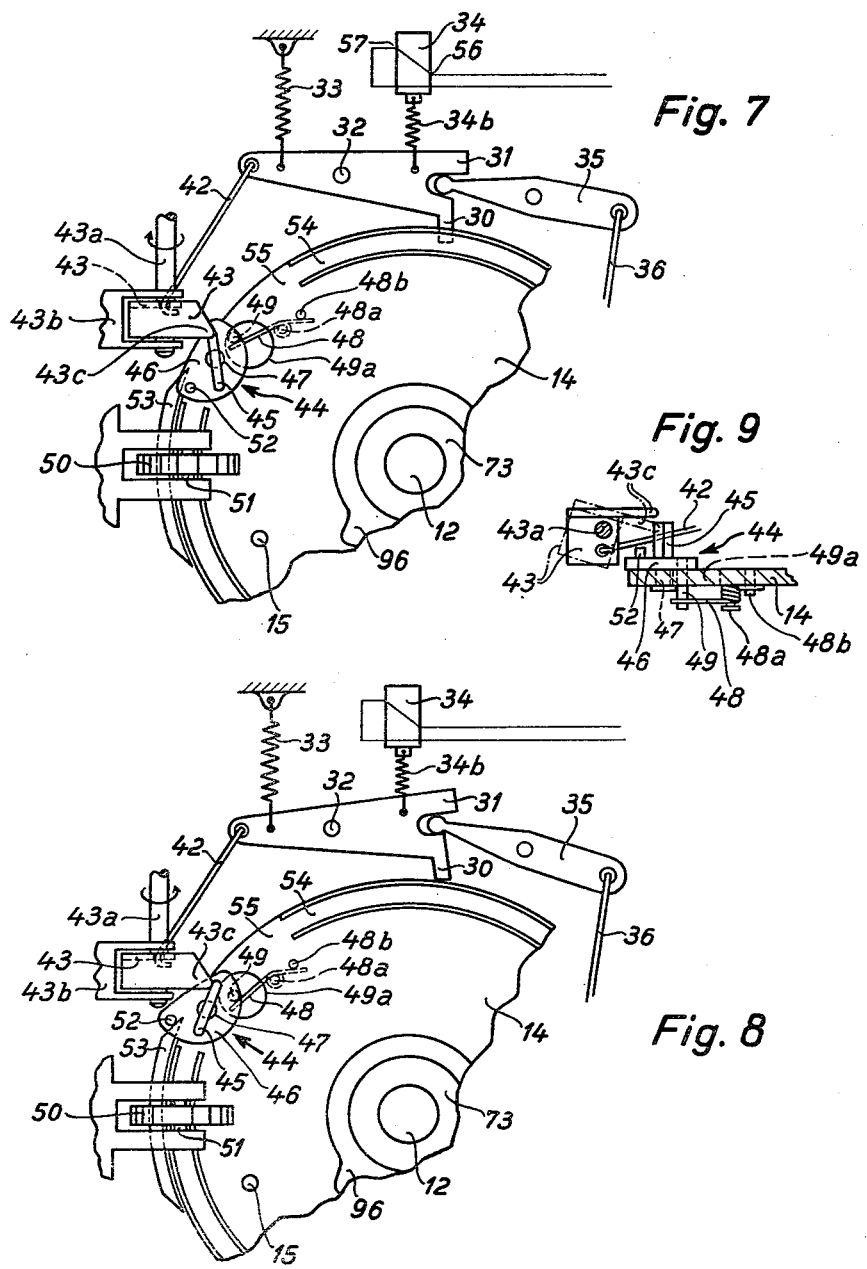

United States Patent Office 3,192,657
Patented July 6, 1965

1

3,192,657
AUTOMATIC SLIDE CHANGING MECHANISM
Hans Mulch, Wetzlar (Lahn), Germany, assignor to Ernst Leitz Gesellschaft mit beschrankter Haftung, Wetzlar (Lahn), Germany
Filed Sept. 20, 1961, Ser. No. 140,182
Claims priority, application Germany, Sept. 23, 1960, L 37,099
6 Claims. (Cl. 40—79)

The present invention relates to a slide projector, more particularly, to an automatic slide changing mechanism for a projector having a unidirectional motor for driving both the slide changing and magazine advancing mechanisms and which motor can be operatively connected by a clutch to a crank disc which, in turn, is operatively connected to the slide changing and magazine advancing mechanisms.

Numerous forms of mechanism have previously been devised which are driven by a motor which actuates both the slide changing and magazine advancing mechanisms. However, these structures have the disadvantage that separate switching elements were necessary to provide for the reversal of the magazine advancing means from a forward to a reverse direction. These switching elements were independent of the gear elements in the slide changing mechanism.

It is therefore the principal object of this invention to provide a novel and improved slide changing mechanism for a slide projector.

It is a further object of this invention to provide a slide projector having a combined yet simplified mechanism for moving the slides and for advancing the slide magazine in either a forward or reverse direction, as desired.

It is another object of this invention to provide a slide projector wherein a connecting structure for actuating a clutch to engage or disengage a crank disc with the motor is constructed simultaneously as a control element for selecting either the forward or reverse movement of the slide magazine wherein this element is mounted on the crank disc and is operatively connected with the slide changing mechanism.

The present invention essentially comprises a unidirectional motor which also drives a cooling fan for ventilating the slide projector. There is a crank disc which is drivingly engageable with the motor through a clutch comprising a pivotally mounted pawl member which is engageable with a gear coaxial with said crank disc.

The slide magazine is conventionally provided with a rack gear on a surface thereof which is engageable by an advancing gear. This advancing gear is intermittently advanced in either a forward or reverse direction by gear actuating means mounted on said cam disc. The gear actuating means is positionable in either of two positions which determines the direction of rotation of the magazine gear.

In order to reverse the gear actuating means an operating lever is provided which is operatively connected with the clutch actuating member. One end of the operating lever projects into the path of movement of the gear actuating means. In its normal position the gear actuating means will move the slide magazine gear in such a way, that the magazine will move in the forward direction. When the clutch is actuated the operating lever will also

2 be moved so as to move the gear actuating means into the reverse direction.

In order that the gear actuating means is not actuated at each engagement of the clutch, structure is provided to ensure that these two switching processes are independent of each other. This is accomplished by spacing the operating lever further along the direction of rotation of the crank disc than the clutch actuating member. As a result, the operation of the gear actuating means is a function of time for actuating the clutch actuating member or of the period after initiating the release of the clutch actuating member.

The clutch actuating member can be either manually or electromagnetically operated. A selector switch can be connected into the electrical circuit connecting the electromagnet with a soure of electrical energy to provide a further structure for reversing the gear actuating means regardless of the time during which the clutch actuating member is operated.

In order to obtain a movement of the slide changing mechanism through only a portion of its complete cycle, an additional locking member can be provided so as to be interposed into the path of the ratchet member. This locking lever is positioned 180° from the clutch actuating member. This locking lever enables the crank disc to be stopped after a projected slide has been returned to the magazine, and an arresting device acting on the magazine advancing gear is released. As a result, the magazine can be manually adjusted.

In addition, a further locking member is provided in the path of the pawl member which releases and locks the crank disc in a particular position as a function of the position of the slide magazine when inserted into the guide way of the projector.

Further objects and advantages of this invention will be apparent upon reference to the accompanying description when taken in conjunction with the following drawings, wherein—

FIGURES 7 and 8 are schematic views showing the forward and reverse positions, respectively, for the gear actuating means; and FIGURE 9 is a lateral view of the operating lever and the gear actuating means.

Figure 1:
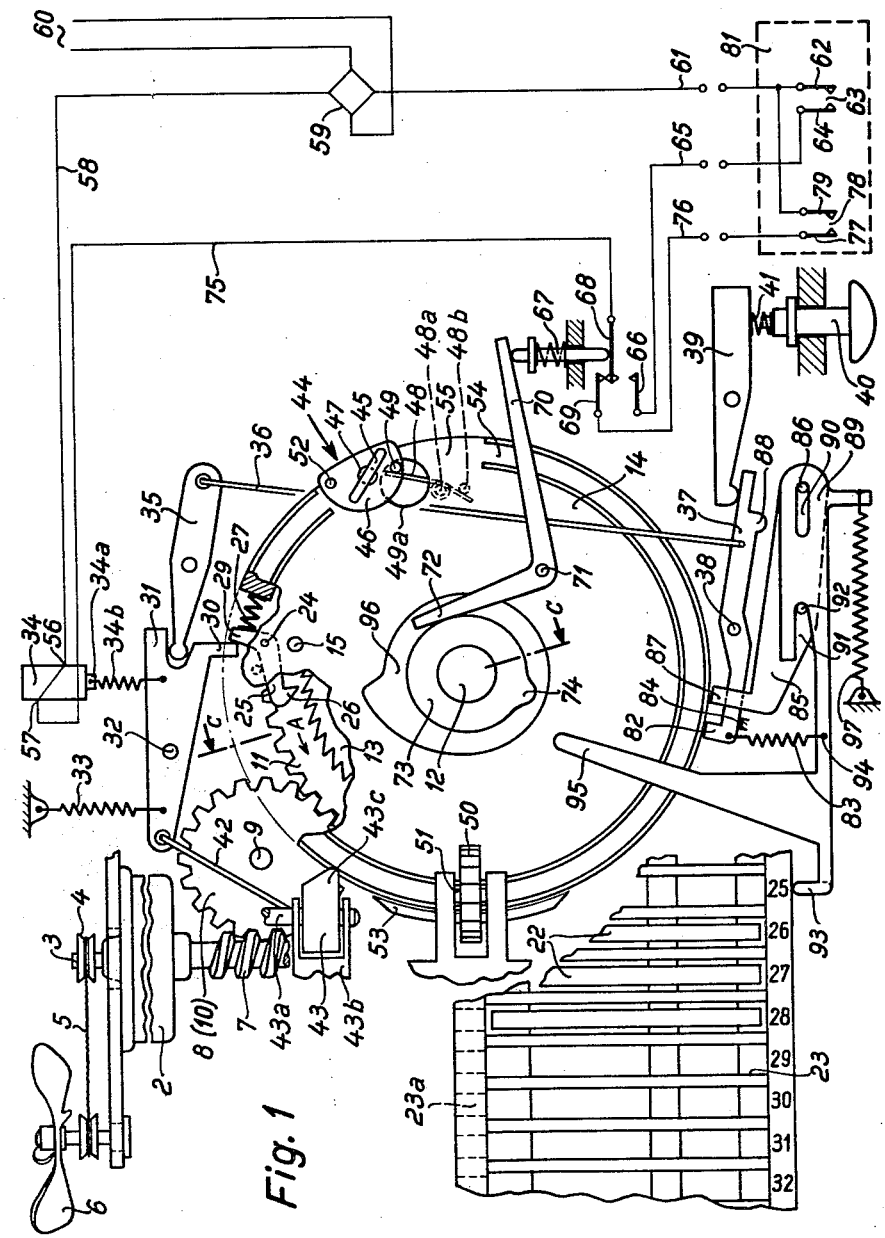
FIGURE 1 is a schematic view of the slide changing and magazine advancing mechanism in a position when the slide is in the projecting position.

Proceeding next to a description of a specific embodiment of this invention with respect to the drawing wherein like reference symbols indicate the same parts throughout the various views, reference is made to FIGURE 1. In a slide projector having a casing indicated at 1 there is a unidirectional electric motor 2 actuated by a suitable switch and having a drive shaft 3 upon which is mounted a pulley 4. A drive belt 5 connects the pulley 4 with another driving pulley 4a mounted on the shaft of a ventilating fan 6.

Also mounted on the drive shaft 3 is a worm 7 which meshes with a worm gear 8 mounted on a shaft 9 upon which is mounted another gear 10. The gear 10 meshes with a gear 11 mounted upon a shaft 12. Fixedly connected with the gear 11 is a disc 13 whose periphery is provided with sawtooth-shaped gear teeth.

Figure 5:
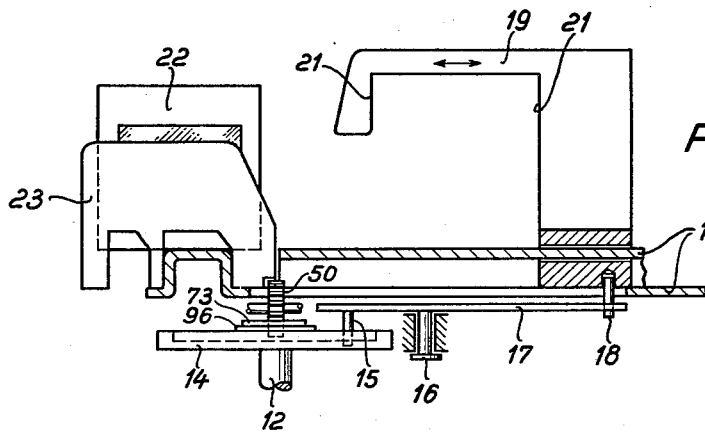
FIGURE 5 is a sectional view of the slide gripping mechanism and its driving means.

A crank disc 14 is rotatably mounted on the shaft 12 and has a crank pin 15 extending therefrom which engages a lever 17 pivotally mounted by a shaft 16, as shown in FIGURE 5. The lever 17 is connected with the slide gripping member 19 which has slide gripping arms 21. The lever 17 is connected with the slide member 19 through the pin 18a which is received in a guide slot 18b.

The lever 17 has a cam-shaped groove 20 into which projects the crank pin 15 and the slot functions to equalize the unequal length of the lever 17 at various positions of the crank disc. The slide gripping arms 21 grip slides indicated at 22 which are inserted into a slide magazine 23. The slide magazine is conventionally provided with a rack gear 23a along one of its bottom edges.

A pawl member 25 is pivotally mounted on the crank disc 14 about an axis 24 and is provided with a detent or tab 26 which is engageable with the teeth on the disc 13. A spring 27 urges the pawl member 25 into engagement with the teeth on the disc 13. The other end of the pawl member 25 is provided with an arm 29 which is engageable by an arm 30 on a locking lever 31 which is pivotally mounted at 32 and also functions as a clutch actuating member. A spring 33 maintains the locking lever 31 in the position as shown in FIGURE 1 with its arms 30 engaging the pawl member arm 29.

An electromagnet 34 having an armature 34a is connected with the locking lever 31 by a spring 34b so that the electromagnet can pivot the locking lever 31 against the action of the tension spring 33.

The locking lever 31 has a notch 31a in one end thereof which receives one end of a pivotally mounted lever 35. The lever 35 is connected by a rod 36 to a second locking lever 37 which is pivotally mounted at 38. The locking lever 38 has one end engageable with a pivotally mounted lever 39 which is actuated by a manually operable button 40 through the medium of a pressure balancing spring 41.

The locking lever 31 is connected by means of a rod 42 with a control lever 43 which together with its axis 43a is pivotable in the bearing 43b. The two end positions of the lever 43 are shown in FIGURE 9 in solid lines and in dot and dash lines respectively. The solid lines position corresponds to the resting position of the locking lever 31 (FIGURE 1) while the dot and dash position corresponds to the disengaging position of the locking lever 31, which is the position it has assumed in FIGURE 8. While the lever 31 is in this disengaging position, the nose 43c of the control lever will have been swung so far down that it will be in the path of the shoulder 45 of the gear actuating means 44. The shoulder 45 is mounted on a plate 46 which is pivotally mounted on a bolt 47 carried by the crank disk 14. On this plate are secured two pins 49 and 52 with the pin 52 extending upwardly from the plate while the pin 49 extends downwardly from this plate through an opening 49a in the disc 14. The pin 49, against which bears the spring 48 that is mounted on supports 48a, 48b, serves together with the opening 49a as a limiting abutment for the gear actuating means 44. The spring 48 urges the means 44 into its second end position (FIGS. 1, 2, 6 and 7).

By rotation of the crank disc 14, the gear actuating means 44 is caused to mesh with the teeth of an indexing gear 50 which is journalled in the fork 51 so as to be able to engage the rack gear 23a of the slide magazine 23. The gear actuating means 44 is shiftable by means of the control lever 43 which is swung into position by the locking lever 31 whereby the gear actuating means 44 is movable either into a first position where it will encounter the spring 48 upon being struck, or into a second position. The transition from the one position into the other is shown in FIGURE 8. For a better understanding, another view is presented in FIGURE 9 which shows the means 44 in its second position. If the locking lever 31 is actuated for disengagement, then the control lever 43 will also be actuated pivotally in the bearing 43b to move it into the path of the gear actuating means 44. If the disc 14 is rotated, the shoulder 45 will ride upon the nose 43c of the control lever 43 (FIGURES 8, 9). The means 44 will then be swung on its axis 47 against the pressure of the spring 48 bearing against the pin 49. After the shoulder 45 has passed by the nose 43c, the gear actuating means 44 would immediately jump back into its former position if some additional means would not be provided to prevent this. For this purpose the arcuate cam 53 is positioned for engagement by the pin 52 during a corresponding angular movement of the disc 14, the length of the cam being sufficient to keep the gear actuating means 44 in this position during engagement of the shoulder 45 with the gear wheel 50.

When the control lever 43 swings the gear actuating means 44, the pin 52 will move with the latter, and upon continued rotation of the disc 14, the pin 52 will ride upon the outer periphery of the cam 53 before the shoulder 45 leaves the nose 43c and will continue to ride upon the cam during continued rotation of the disc. While the gear actuating means 44 is retained in such a swung-out second position, the shoulder 45 will be kept at a definite angle relative to the teeth of the gear 50 which will be rotated either forwards or backwards, depending on the inclination of the shoulder. If the control lever 43 is not actuated during the passage of the gear actuating means 44, then the latter will remain in its original first position. The pin 52 will then move along the inner periphery of the arcuate cam 53 which will then prevent the means 44 from being swung outwardly by engagement of the shoulder 45 with the teeth of the gear 50.

In order to prevent movement of the gear wheel 50 during all of the positions of the crank disc 14, a grooved track 54 is arranged on the crank disc 14. The track 54 is continuous except for a space in the area of the gear actuating means 44 and at a space 55 which corresponds to the position of the crank disc 14 and the slide 19, respectively, for manual manipulation of the slide magazine.

The position of the pawl member 25 and the gear actuating means 44 with respect to the crank pin 15 is such that when the pawl member 25 is in its locked position, because of the locking lever 31, the slide member 19 is in such a position that the slide 22 can be projected. In this position the gear actuating means 44 is so located, with respect to the gear wheel 50, that after a rotation of 180° of the crank gear 14, during which the slide member is returned from its projecting position to its original position, the gear actuating means 44 engages the gear wheel 50 in order to move the slide magazine 23.

The electrical circuit by which the electromagnet 34 is energized is illustrated in FIGURE 1. This circuit comprises a lead 58 which connects one terminal 56 of the electromagnet with a rectifier 59 which is connected across a source of electrical energy 60. The rectifier 59 is connected by lead 61 with a movable contact arm 62 of a selector switch 63. The selector switch 63 also comprises a movable contact arm 64 which is connected through a lead 65 to a terminal 66 of a switch 67. The switch 67 comprises a movable contact arm 68 which normally engages a contact 69 but is movable towards the contact 66. The movable contact arm 68 is moved into engagement with the contact 66 by means of a crank lever 70 which is pivotally mounted on a stationary shaft 71 and has an arm 72 which is engageable with a cam disc 73 having a cam 74. The cam disc 73 rotates with the crank disc 14.

The movable contact arm 68 is connected through a lead 75 with a terminal point 57 of the electromagnet 34.

The terminal 69 is connected through a lead 76 with a contact 77 which forms part of a switch 78. The switch 78 also comprises a contact arm 79 which is connected to the contact 62 by a lead 80.

The switches 63 and 78 can be mounted on the casing 1 of the slide projector. However, it is also possible to locate these two switches in a switch box 81 which is remotely located from the slide projector but connected thereto by a cable.

The locking lever 37 also comprises a detent or tab 82 which is positioned in the path of the arm 29 of the pawl member 25. A spring 83 retains the locking lever 37 against a stop 84.

A further locking member is indicated at 85 and is pivotally mounted about a shaft 86. This locking member comprises a locking detent or tab 87 which also extends into the path of the pawl member 25. The locking member 85 is triggered by means of a stop member 88 on the locking lever 37.

There is an angular lever 89 which is also pivotally mounted on the shaft 86 by means of a slot 90. In the central portion of the lever 89 there is a recess 91 which tapers inwardly towards the pivotal axis 86. A pin 92 which is mounted on the locking member 85 extends into the recess 91. A spring 83 which is connected to the locking lever 37 is attached to the angular lever 89 at 94.

The angular lever 89 is provided with a scanning arm 93 which extends into the path of movement of the slide magazine 23 and a feeler arm or contacter 95 which extends into the path of a cam disc 96 fixedly mounted on the crank disc 14. A spring 97 urges the lever 89 into the position as shown in FIGURE 1.

With the above-described construction of the present invention in mind, a description of the operation of this invention including the several different functions of the mechanism will next be described.

Assuming that the slide magazine has already been inserted into the slide projector and the slide member has taken the position immediately after a slide has been projected, the process of changing a slide will next be described. Since the motor 2 is already running, the ventilating fan 6 will cool the lights of the projector and the gears 11 and 13 will be rotated in the direction indicated by the arrow A in FIGURE 1.

At this starting position the crank pin 15 and the pawl member 25 as well as the gear actuating means 44 are in the position shown in FIGURE 1.

In order to change the slide, the switch 78 must be closed and this energizes the following circuit: Contact 77, lead 76, contacts 69 and 68, lead 75, the electromagnet 34, lead 58 and the rectifier 59, lead 61 to contact 62 and lead 80 back to switch 78. As the electromagnet 34 is energized, the armature 34a is moved upwardly to pivot the locking lever 31 about its axis 32 against the action of the spring 33. In addition, the lever 35 is pivoted and the levers 38 and 39 are also pivoted because of the interconnecting rod 36. These last-mentioned levers, however, do not contribute to the function of changing the slide.

Figure 3:
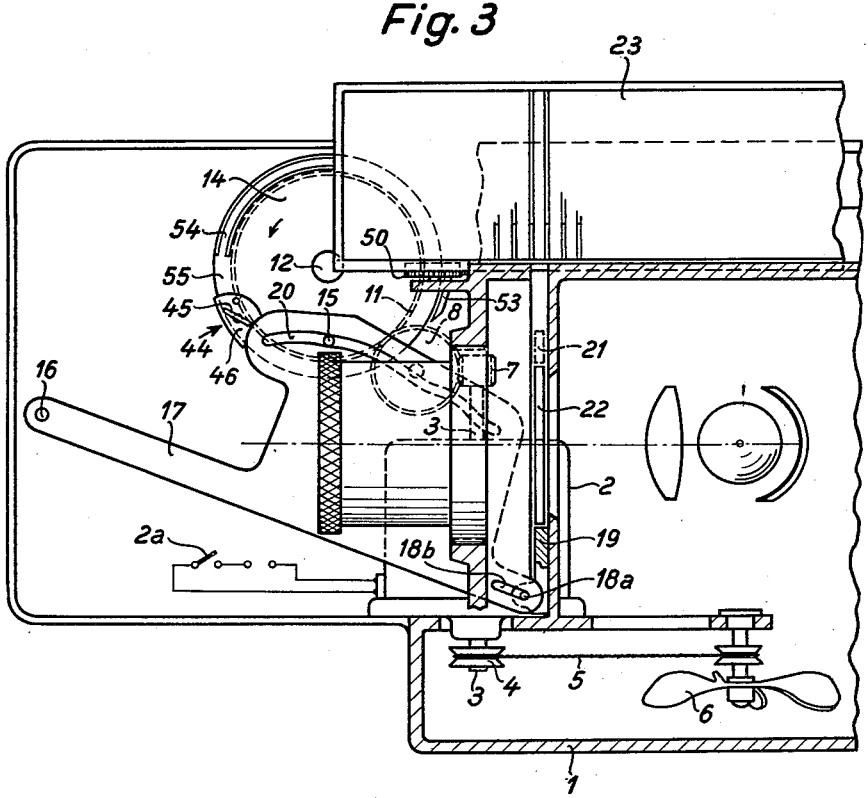
FIGURE 3 is a schematic view of the projector showing the slide changing mechanism and the magazine advancing means.
Figure 4:
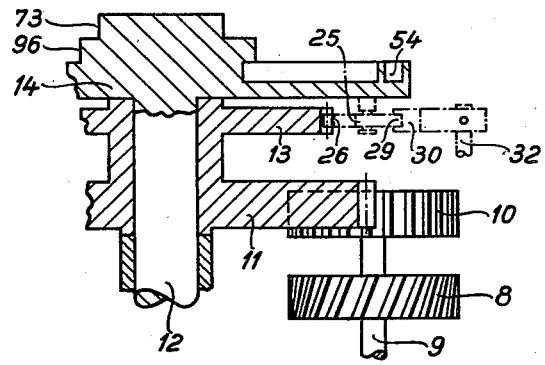
FIGURE 4 is a sectional view, taken along the line C—C of FIGURE 1.

When the locking lever 31 is pivoted, the arm 30 is disengaged from the arm 29 and thus the pawl 25 is permitted to pivot so that the notch 26 engages the teeth on the periphery of the gear 13. Since the gear 13 is continuously rotating in conjunction with the motor, the crank disc 14 is now drivingly connected to the motor and rotates with the disc 13. Each complete revolution of the crank disc 14 causes the slide member 19 to be moved forward and backward by means of the lever 17. The slide which is in the projecting position as shown in FIGURE 3 is then gripped by the gripping arms 21 and returned to the magazine 23. After the slide magazine has been advanced the distance equal to the width of a slide compartment in a way that will be presently described, a new slide is gripped and the slide member is again returned to its projecting position.

The rotation of the crank disc 14 is stopped by the locking lever 31 which has returned to its initial position as shown in FIGURE 1. In this position the arm 30 is in the path of the arm 29 of the pawl member 25 and pivots the pawl member 25 so that the detent 26 is released from the gear teeth on the disc 13.

After rotation of the crank disc 14 through an angle which is a portion of a revolution the gear actuating means 44 reaches the zone of the operating lever 43 as shown in FIGURES 7 through 9. The operating lever 43 is spaced at about an angle of 120° with respect to the detent 30 of the locking lever 31. When the switch 78 has been opened so as to deenergize the electromagnet 34, the locking lever 31 returns to its original position under the action of the spring 33 and the operating lever also returns to its initial position in which it does not contact the gear actuating means 44. The gear actuating means 44 is now in the position as illustrated in FIGURE 1.

As the crank disc 14 continues to rotate, the shoulder 45 engages the gear wheel 50 to advance the slide magazine. This occurs when the crank disc has rotated through an angle of about 180°. Prior to the crank disc 14 reaching this position, the slide member 19 has been moved out sufficiently far so that the grips 21 could return the slide 22 into the magazine 23, and the magazine can now be moved forward or backward when the gear wheel 50 engages the rack gear 23a on the slide magazine.

In the above-described process the position of the gear actuating means 44 and its shoulder 45 is such that the slide magazine is moved in a forward direction a distance equal to the width of one slide compartment. The control device comprising the pin 52 and the cam 53 is provided that the gear actuating means 44 maintains the desired position during the entire switching step. The pin 52 slides along the inner edge of the cam 53 and prevents any movement of the gear actuating means 44 during this switching step.

The position of the operating lever 43 determines whether the magazine is moved in a forward or reverse direction. The position of the control lever 43 is determined by the actuation of the locking lever 31 which is connected thereto by the rod 42. When the locking lever 31 is pivoted for only a short period of time, the control lever 43 will return to its initial position before the gear actuating means 44 reaches the operating lever. Accordingly, during a short actuation of the electromagnet 34 the magazine 23 is moved in a forward direction.

In the event it is desired to move the magazine in a reverse direction, the locking lever 31 must be held down during a longer period of time or must be pivoted again when the gear actuating means 44 enters the control zone of the operating lever 43. The control lever 43 has been swung so far down that the nose 43c will be in the path of the gear actuating means 44 which during continued rotation of the disc will be pressed back against the force of the spring 48. The pin 52 which will partake of such movement is thereby brought into a position from which it can get upon the outer periphery of the arcuate cam 53 and while in this position it will keep the gear actuating means in this position after leaving the control lever 43. While the gear actuating means is in this position the shoulder 45 will be in such a position relative to the wheel 50 that this wheel will now be moved in a reverse direction with respect to the previously described rotation, so that the slide magazine is now moved in a reverse direction by a distance equivalent to a compartment width.

Not only can the locking lever 31 by pivoted by the electromagnet 34, but also by means of the manually actuated adjusting member 40. Pushing of the button 40 inwardly will pivot the lever 39 which, in turn, will pivot the locking lever 37, and thus move the connecting rod 36. As a result, the locking lever 31 will be pivoted through the pivoting action of the lever 35. Thus, when the button 40 is pushed, the locking lever 31 is pivoted to release the arm 29 of the pawl member 25 in the same manner as accomplished by energization of the electromagnet 34. The reversal of the control lever 43, so as to select a forward or reverse movement of the slide magazine, is accomplished in the same manner as can be carried out by pressing the button 40 for a short or long period of time.

A special safety feature has been provided to ensure that when the locking lever 31 is pivoted by the electromagnet 34, the magazine is moved in the desired direction regardless of how long the switch is actuated. This feature comprises the selector switch 63 which has two operating positions corresponding to the forward and reverse movement of the slide magazine. For forward movement of the magazine the contacts 62 and 64 are opened, whereas for the reverse movement of the magazine the contacts 62 and 64 are closed.

As has been previously described, the electromagnet 34 can be energized for a sufficient period of time to enable the gear actuating means 44 to be rotated into engagement with the control lever 43. However, should the electromagnet 34 be deenergized prior to the engagement of the control lever 43 by the gear actuating means 44, the present safety feature will ensure that the magazine will be moved in a reverse direction. When it is desired to move the magazine in a reverse direction so as to take a particular slide therefrom for projection, the selector switch 63 must be moved to close the contacts 62 and 64. This ensures that the electromagnet 34 will continue to be energized to enable the gear actuating means 44 to be adjusted to the reverse position by the control lever 43. As the gear actuating means 44 comes into the area of the control lever 43, the cam 74 will be in such a position so as to pivot the crank lever 70. This will actuate the switch 67 so that the movable contact arm 68 is pivoted into contact with the terminal 66. This maintains the energization circuit for the electromagnet 34 closed even though the switch 78 is open. Electric current will then flow through the following circuit: Electromagnet 34, terminal 56, lead 58, rectifier 59, current source 60, lead 61, contact arm 62, contact arm 64, lead 65, terminal 66, movable contact arm 68, lead 75 and terminal 57.

In the event a forward movement of the slide magazine is desired and it is sought to prevent reverse movement of the slide magazine, this can also be accomplished by the selector switch 63. The selector switch 63 is then switched to its forward position wherein the contacts 62 and 64 are open. To prevent the magazine from being moved in a reverse direction, the invention provides that the electromagnet 34 is deenergized when the gear actuating means 44 comes into engagement with the control lever 43. The circuit is the same as previously described when the switch 78 is closed to energize the electromagnet 34. When the crank disc 14 rotates through a small angle, the cam 74 will engage the lever arm 72 of the crank lever 70 so as to actuate the switch 67. As a result, the previously closed connection between movable contact arm 68 and the terminal 69 is broken and the electromagnet is deenergized.

This safety feature, however, operates only when the locking lever 31 is pivoted by energization of the electromagnet 34. In the event the locking lever 31 is manually pivoted by pushing the button 40, the button 40 must be depressed for a long or short period of time in order to effect the desired forward or reverse movement of the slide magazine.

Figure 2:
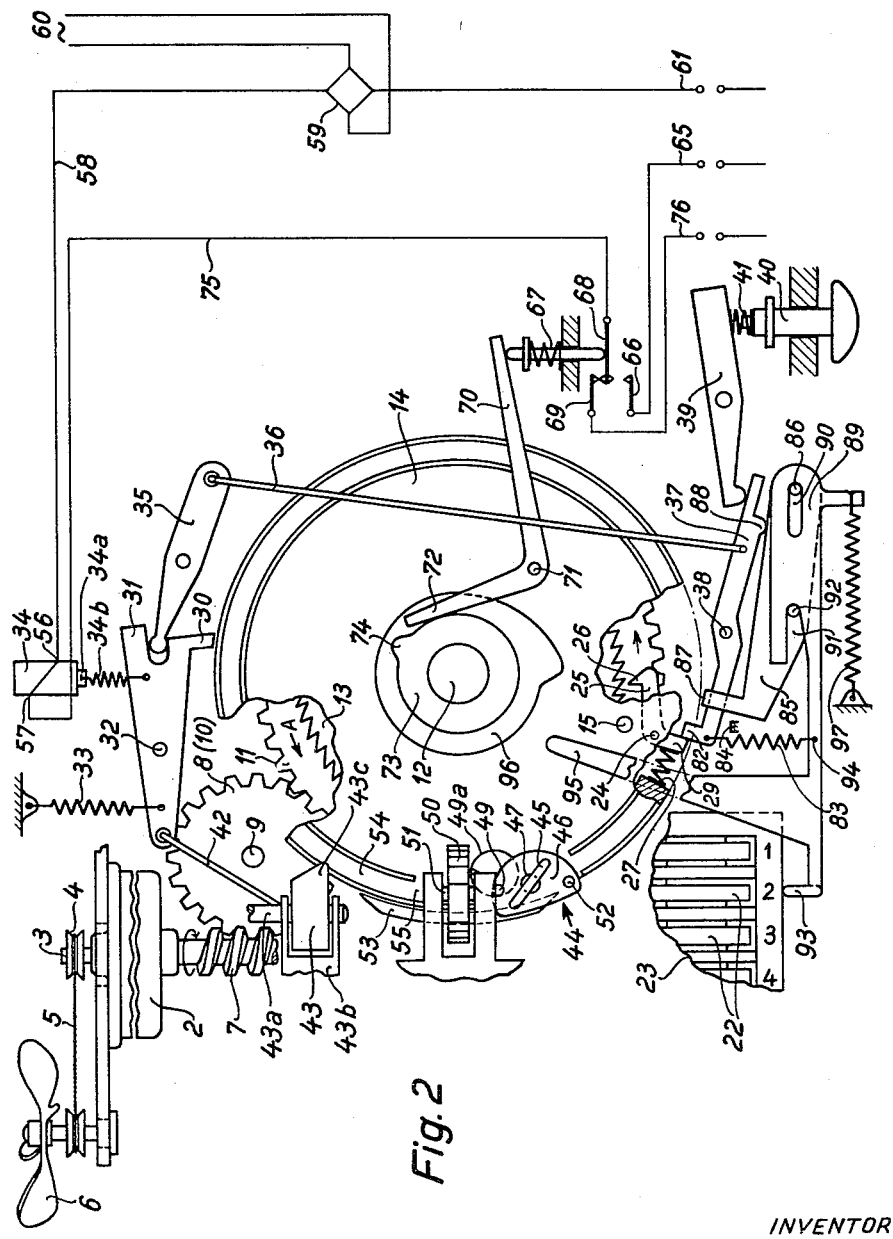
FIGURE 2 is a schematic view similar to that of FIGURE 1 but with the elements positioned to permit a manual feeding of the slide magazine.

The detent 82 which is a portion of the locking lever 37 can also be moved into the path of the pawl member 25 in the position as shown in FIGURE 2. The locking lever 37 is actuated simultaneously with the locking lever 31 since they are operatively connected through the elements 35 and 36. In the normal or unactuated positions of the locking lever 37, the detent 82 is outside of the path of the pawl member 25. However, the detent is moved into the path of the pawl member 25 when the locking levers 31 and 37 are pivoted. The result of moving the detent 82 into the path of the pawl member 25 is to stop the rotation of the crank disc 14 after this disc has rotated through an angle of 80°. As a result, the crank disk 14 can be stopped after a half revolution when the button 40 or the electromagnet 34 are actuated during a prolonged period of time.

In this stopped position of the crank disc 14, the gear actuating means 44 has moved the gear wheel 50 by one switching step and then is immediately stopped. The opening 55 in the groove 54 is then positioned exactly in the zone of the gear wheel 50, which permits the gear wheel 50 to be freely rotatable. Therefore, in this position a slide magazine can be exchanged or the slide magazine in the projector can be moved forwardly or in reverse direction manually.

At this time, should the button 40 be released or the electromagnet 34 be deenergized, the locking lever 37 will again return to its initial position under the action of the spring 83. This disengages the detent 82 from the pawl member 25 and the crank disc 14 is again drivingly connected to the motor and rotates with the gear disc 13. However, the rotation of the crank disc is again stopped by the projecting arm 30 of the locking lever 31 that has, in the meantime, returned to its initial position and engaged the arm 29 of the pawl 25. In order to perform an additional slide changing operation, either the electromagnet 34 must be energized or the button 40 must be depressed. When the magazine is inserted and is in the position as shown in FIGURE 1, the operation will begin again as described above.

Figure 6:
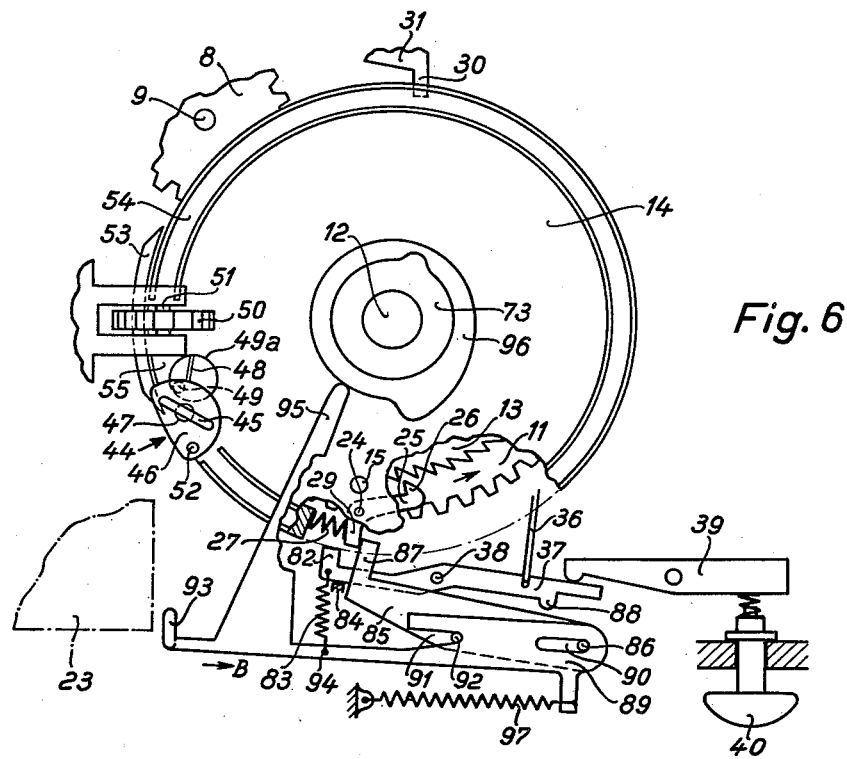
FIGURE 6 is a schematic view of the disc and additional elements of the slide changing mechanism in a position wherein the magazine has not yet reached a position to engage an actuating member.

The present invention also comprises a feature which prevents movement of the slide changing mechanism when there is no slide magazine in the projector. When there is no slide magazine in the guideway of the projector the angular lever 89 is in the position as illustrated in FIGURE 6. The spring 97 has moved the angular lever against the pivot mounting pin 86. The angular lever 89 so pivots the locking member 85 through the pin and recess connection 91 and 92, that the detent 87 is moved into the path of the pawl member 25.

The same pivoting movement of the levers 89 and 85 also occurs after a magazine has been advanced by its full length through the guideway of the projector and the scanning arm 93 has become disengaged from the side wall of the slide magazine. This occurs, however, only in the moment after the shoulder 45 has been in engagement with the gear wheel 50 and the magazine has just been moved. At this time the pawl member 25 is always in a position in front of either detent 82 or detent 87 when the magazine has just been fed or when no magazine has been inserted into the guideway. When the button 40 is depressed or the electromagnet 34 is actuated after a magazine has been passed therethrough, the detent 82 will remain in the path of the pawl 25. However, it will permit a short rotation of the crank disc 14 until the pawl 25 engages the detent 87.

When a new slide magazine has been introduced into the projector, the forward wall thereof will abut the scanning arm 93 of the angular lever 89. As the magazine is pushed further into the projector, the angular lever 89 will remove linearly in the direction of the arrow B (see FIGURE 6) because of the slot 90. The pin 92 which is mounted on the locking member 85 will move into the wide portion of the recess 91 of angular lever 89. It is now possible for the locking member 85 to become disengaged from the pawl 25. This disengagement of the detent 87 from the pawl 25 is effected either by depressing the button 40 or energizing the electromagnet 34. During the resultant pivoting of the locking lever 37 about its axis 38, the stop 88 on the locking lever 87 will transmit this pivoting movement to the lever 85. Since the pin 92 has a freedom of movement in the recess 91, the lever 85 will pivot and thereby permit the pawl 25 to engage the teeth of the disc 13 so as to couple the crank disc 14 to the motor.

Prior to the return of the pawl member 25 into the position as illustrated in FIGURE 2, the cam disc 96 will rotate into the range of the contact arm 95 to cause the angular lever 89 to pivot and return to its initial position under the action of the spring 97. In subsequent slide changes the cam disc 96 will no longer engage the end of the contact arm 95 since the angular lever 89 is retained in the positon which is presently occupies wherein the scanning arm 93 engages the side wall of the slide magazine. Only after the slide magazine completely passes through the guideway can the scanning arm 93 become released from the side wall of the magazine to cause a pivoting movement of the angular lever 89. This pivoting movement will also pivot the locking lever 85 and the detent 87 will again be positioned in the path of the pawl member 25.

In order to prevent an actuation of the levers 37, 85 and 89 and, consequently, a rotation of the crank disc 14 and the slide member 19, a spring 41 is provided between the lever 39 and the manually actuated button or key 40. In addition, another spring 34b is connected between the electromagnet 34 and the locking lever 31. The respective strengths of these two springs are so selected that they are less than the strength of the spring 83 for the angular lever 89, so that the angular lever 89 will also pivot when the locking lever 37 is pivoted.

It is therefore apparent that the present invention has disclosed a novel and improved slide changing mechanism for a slide projector wherein several functions of the projector are combined in a single mechanism.

It will be understood that this invention is susceptible to modification in order to adapt it to different usages and conditions and, accordingly, it is desired to comprehend such modifications within this invention as may fall within the scope of the appended claims.

What is claimed as this invention is:

1. An automatic slide changing mechanism for slide projectors, and comprising a unidirectional motor, a gear driven by said motor, a crank disc coaxial with said gear, a pawl pivotally mounted on said crank disc, spring means biasing said pawl to engage said gear, a pivotally mounted lever having a tab on one end thereof engageable with said pawl, means for manually pivoting said lever whereby said pawl is released to engage said gear and thereby drivingly connects said disc with said motor, means interconnecting said crank disc with a slide changing mechanism so that the rotation of said disc actuates the mechanism, a second gear engageable with a slide magazine for intermittently advancing the magazine, actuating means on said disc for actuating said second gear in intermittent movement, a pivotally mounted operating lever projecting into the path of said actuating means, means interconnecting said operating lever and said pivotally mounted lever so that pivoting of said lever will actuate said operating lever to advance said second gear in one of a forward and reverse direction to correspondingly move the slide magazine. said actuating means and the lever connected thereto being so positioned in the direction of rotation of said cam disc that said actuating means is operated by said operating lever after said ratchet has been released to drivingly couple said crank disc and said first gear.

2. An automatic slide changing mechanism for slide projectors, and comprising a unidirectional motor, a first gear driven by said motor, a crank disc coaxial with said first gear, a pawl member pivotally mounted on said crank disc, spring means biassing said pawl member to engage said first gear, a lever pivotally mounted and having a tab engageable with said pawl member, a second gear engageable with a slide magazine for intermittently advancing the magazine, actuating means on said crank disc for actuating said second gear in intermittent movement, a pivotally mounted operating lever projecting into the path of said actuating means, means interconnecting said operating lever and said pivotally mounted lever, and means for pivoting said lever to an operating position so that said lever actuates said operating lever to advance said second gear in one of a forward and reverse direction to correspondingly move the slide magazine, said lever remaining in the operating position as long as said pivoting means is operated so that said actuating means is operated as a function of the operating time of the lever.

3. An automatic slide changing mechanism for slide projectors, and comprising a unidirectional motor, a first gear driven by said motor, a crank disc coaxial with said first gear, a pawl pivotally mounted on said crank disc and having spring means for urging said pawl into engagement with said first gear, a pivotally mounted lever having a tab on one end thereof engageable with said pawl member, an electromagnet having its armature connected to said lever so that energization of said electromagnet pivots said lever, an electrical circuit connecting said electromagnet to a source of electrical energy, means interconnecting said crank disc with a slide changing mechanism so that rotation of said disc actuates the mechanism, a second gear engageable with a slide magazine for intermittently advancing said slide magazine, actuating means on said crank disc for actuating said second gear in intermittent movement, a pivotally mounted operating lever projecting into the path of said actuating means, means interconnecting said operating lever and said pivoted lever so that pivoting of said lever will actuate said operating lever to advance said second gear in one of a forward and reverse direction to correspondingly move the slide magazine, a manually operated selector switch in said electric circuit for energizing said electromagnet and for selecting the direction of movement of a slide magazine, a second switch in said electric circuit, and means actuated by said cam disc for closing said second switch when said actuating means has moved to engage said operating lever whereby the energization of said electromagnet is ensured and the actuation of said operating lever is independent of the initial energization of said electromagnet.

4. An automatic slide changing mechanism for slide projectors as claimed in claim 3 wherein said switch closing means comprises a cam mounted on said crank disc, a crank arm with one end being engageable with said cam and the other end engageable with said second switch, said cam being angularly positioned from said actuating means so that said lever is operated by said cam just prior to the engagement of said actuating means with said operating lever.

5. An automatic slide changing mechanism for slide projectors as claimed in claim 3 and further comprising a switch body housing said manually operated selector switch and a switch for energizing said electromagnet, and a control cable connecting said switch body to the projector.

6. An automatic slide changing mechanism for slide projectors, and comprising a unidirectional motor, a gear driven by said motor, a crank disc coaxial with said gear, a pawl pivotally mounted on said crank, spring means biasing said pawl to engage said gear, a pivotally mounted lever having a tab on one end thereof engageable with said pawl so that actuation of said lever will release said pawl whereby said gear is engaged to drivingly connect said crank disc with said motor, means interconnecting said crank disc with a slide changing mechanism so that rotation of said disc actuates the mechanism, a second gear engageable with a slide magazine for intermittently advancing the magazine, actuating means on said disc for actuating said second gear in intermittent movement, a pivotally mounted control lever projecting into the path of said actuating means, and means interconnecting said control lever and said first-named pivotally mounted lever so that pivoting of said first-named lever will actuate besides said pawl said control lever to advance said second gear into one of the forward and reverse directions to correspondingly move the slide magazine.

References Cited by the Examiner

UNITED STATES PATENTS

| | | | |
|---|---|---|---|
| 2,962,913 | 12/60 | Martin | 74—425.5 |
| 2,979,987 | 4/61 | Brumley et al. | 88—28 |
| 3,023,669 | 3/62 | Hall | 88—28 |
| 3,059,360 | 10/62 | Krauskopf | 88—28 |

FOREIGN PATENTS 838,683 6/60 Great Britain.

LEO SMILOW, *Primary Examiner.*

EMIL G. ANDERSON, LEYLAND M. MARTIN,
*Examiners.*